(12) United States Patent
Klepper

(10) Patent No.: US 8,349,046 B2
(45) Date of Patent: Jan. 8, 2013

(54) METHOD OF MAKING SYNGAS AND APPARATUS THEREFOR

(75) Inventor: James Klepper, Thornton, CO (US)

(73) Assignee: Enerjetik LLC, Denver, CO (US)

( * ) Notice: Subject to any disclaimer, the term of this patent is extended or adjusted under 35 U.S.C. 154(b) by 303 days.

(21) Appl. No.: 12/768,841

(22) Filed: Apr. 28, 2010

(65) Prior Publication Data

US 2010/0276641 A1 Nov. 4, 2010

Related U.S. Application Data

(60) Provisional application No. 61/174,036, filed on Apr. 30, 2009, provisional application No. 61/289,643, filed on Dec. 23, 2009.

(51) Int. Cl.
*B01D 48/12* (2006.01)
*C01B 3/24* (2006.01)

(52) U.S. Cl. ........................................ 55/459.1; 423/650

(58) Field of Classification Search .................. None
See application file for complete search history.

(56) References Cited

U.S. PATENT DOCUMENTS

| | | |
|---|---|---|
| 3,779,725 A | 12/1973 | Hegarty et al. |
| 3,932,146 A | 1/1976 | Wilson et al. |
| 3,985,519 A | 10/1976 | Kalina et al. |
| 4,153,426 A | 5/1979 | Wintrell |
| 4,229,185 A | 10/1980 | Sass |
| 4,244,180 A | 1/1981 | Rasor |
| 4,302,218 A | 11/1981 | Friedman |
| 4,372,755 A | 2/1983 | Tolman et al. |
| 4,592,762 A | 6/1986 | Babu et al. |
| 4,699,632 A | 10/1987 | Babu et al. |
| 4,758,249 A | 7/1988 | Bernard et al. |
| 4,853,003 A | 8/1989 | Dewitz |
| 4,872,886 A | 10/1989 | Henley et al. |
| 4,888,031 A | 12/1989 | Martens |
| H1325 H | 7/1994 | Doering et al. |
| 5,656,044 A | 8/1997 | Bishop et al. |
| 5,670,061 A | 9/1997 | Kowallik et al. |
| 6,863,878 B2 | 3/2005 | Klepper |
| 6,911,058 B2 | 6/2005 | Calderon et al. |
| 7,066,984 B2 | 6/2006 | Dunn |
| 7,090,707 B1 | 8/2006 | Barot |
| 7,189,270 B2 | 3/2007 | Bryan et al. |
| 7,229,483 B2 | 6/2007 | Lewis |
| 7,452,392 B2 | 11/2008 | Nick et al. |
| 7,503,947 B2 | 3/2009 | Barnicki |
| 7,556,659 B2 | 7/2009 | Kim |

(Continued)

OTHER PUBLICATIONS

International Search Report and Written Opinion, mailed Jul. 2, 2010.

(Continued)

*Primary Examiner* — Melvin C Mayes
*Assistant Examiner* — Kenneth Vaden
(74) *Attorney, Agent, or Firm* — Wood, Herron & Evans, LLP

(57) ABSTRACT

Syngas is formed by combining a carbon source with steam at an elevated temperature in a generally horizontal reactor. The heat for the reaction is provided by a stoichiometric combustion nozzle at a first end of the horizontal reaction chamber. The carbon source is deposited downwardly into the reaction chamber where it combines with a flowing stream of hot gas formed from the stoichiometric combustion in combination with steam and additional oxygen, if necessary. This flowing stream of gas reacts with the deposited carbon feed source and is directed to a cyclone separator where the formed syngas is recovered from an upper portion of the separator and any formed ash is directed into a collection tank.

6 Claims, 3 Drawing Sheets

U.S. PATENT DOCUMENTS

| | | |
|---|---|---|
| 2003/0046868 A1 | 3/2003 | Lewis |
| 2004/0123601 A1 | 7/2004 | Fan |
| 2007/0051043 A1 | 3/2007 | Schingnitz et al. |
| 2007/0137107 A1 | 6/2007 | Barnicki |
| 2009/0013601 A1 | 1/2009 | Mandich et al. |
| 2009/0020456 A1 | 1/2009 | Tsangaris et al. |
| 2009/0145028 A1 | 6/2009 | Ribesse |
| 2009/0151252 A1 | 6/2009 | Young |
| 2010/0003553 A1 | 1/2010 | Pfefferle |

OTHER PUBLICATIONS

Katofsky et al. "The Thermochemical Biorefinery", Florida Farm to Fuel Summit, Jul. 18-20, 2007. [Retrieved on Feb. 16, 2010] from the Internet: www.floridafarmtofuel.com/ppt/2007/Katofsky.ppt.

METHOD OF MAKING SYNGAS AND APPARATUS THEREFOR

RELATED APPLICATION

This application is related to and claims the benefit of U.S. Provisional Patent Application Ser. No. 61/174,036, filed Apr. 30, 2009, and U.S. Provisional Patent Application Ser. No. 61/289,643, filed Dec. 23, 2009, the disclosures of both of which are incorporated herein by reference.

BACKGROUND OF THE INVENTION

Syngas is a combination of carbon monoxide and hydrogen. Although it can be formed under various conditions, it basically is formed by reacting a carbon source with steam at elevated temperatures, generally in the absence of oxygen. This causes the carbon source to react with the steam, forming carbon monoxide and hydrogen. One reactor that is particularly suited for use in the formation of syngas is Klepper, U.S. Pat. No. 6,863,878. This reactor combines char with steam at elevated temperatures. It discloses a particularly effective method to form the char without pyrolysis.

SUMMARY OF THE INVENTION

The present invention is premised on the realization that syngas can be formed by combining a carbon source directly with a combustion stream formed by burning a fuel, preferably syngas, in the presence of oxygen, and combining the reaction product with steam and, if necessary, additional oxygen. A carbon source is combined with the steam and combustion gases to form syngas. The syngas flows directly into a cyclone separator where any unreacted ash falls to the bottom of the separator and the syngas is collected from the top.

The reactor includes a horizontal reaction chamber in which the combustion gases and steam are introduced at one end to form a horizontal stream of hot gas. An auger-type mechanism can be used to introduce carbon feed material and drop this into the flowing stream of reactant gases. The horizontal reaction chamber connects to a cyclone separator along a tangent to create tangential flow of the reaction products. The bottom of the cyclone separator is directed to a collection container, preferably filled with water, to collect and quench any formed ash. A collector tube exits from the top of the cyclone separator, providing a flow passage for the formed syngas. This provides a simple, direct method to form syngas from a carbonaceous material.

The objects and advantages of the present invention will be further appreciated in light of the following detailed description and drawings in which:

DETAILED DESCRIPTION

Figure 1:
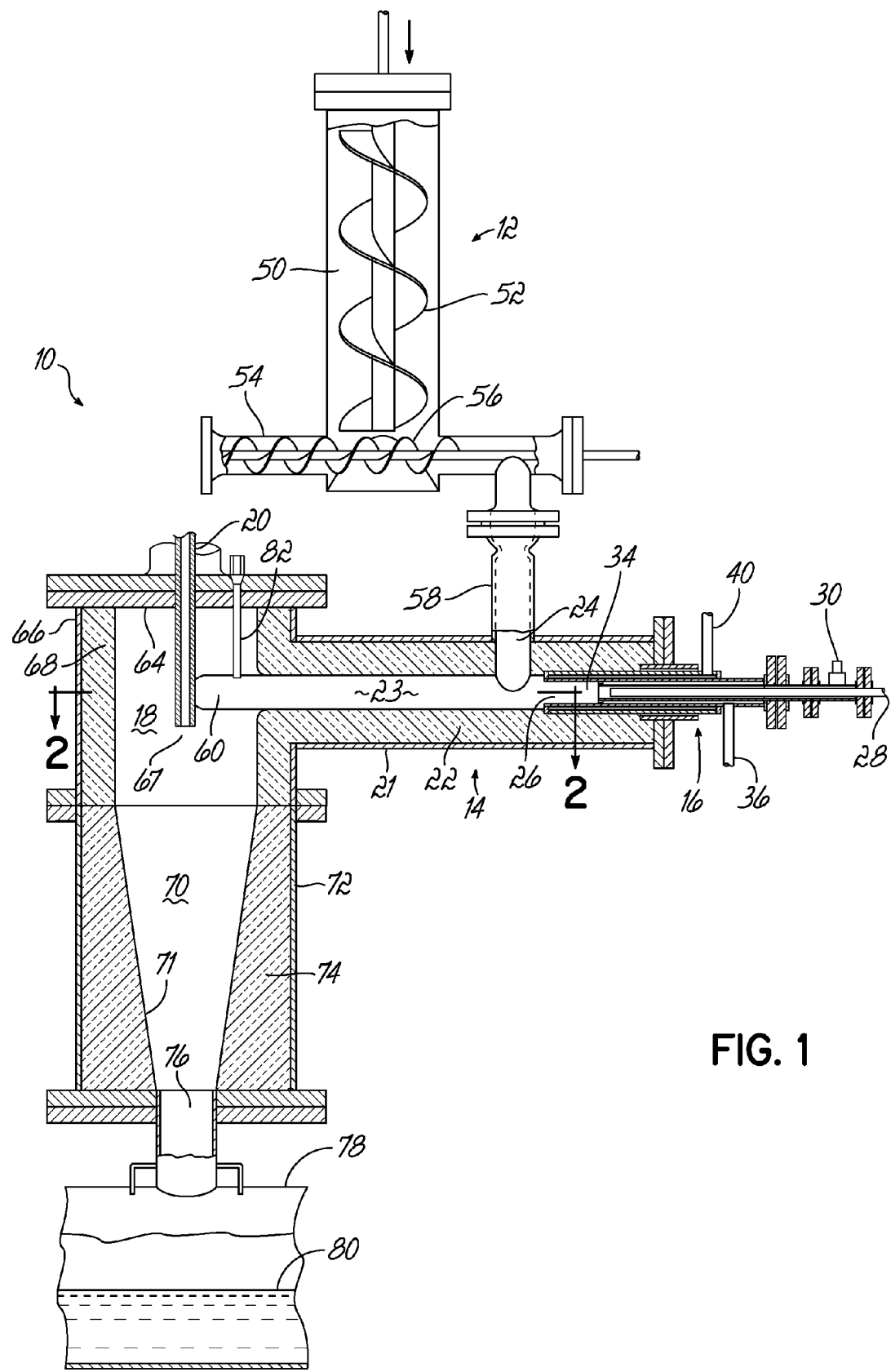
FIG. 1 is a cross sectional view of the apparatus for use in the present invention.

As shown in FIG. 1, a syngas reactor 10 includes a feed conveyor system 12 which leads to a horizontal reactor 14 having a combustion nozzle 16. Nozzle 16 is adapted to heat carbon feed introduced into the horizontal reactor 14. Horizontal reactor 14, in turn, leads to a cylindrical residence chamber 18 which has a gas outlet 20.

The horizontal reactor 14 as shown includes a steel casing 21 and a refractory liner 22 which defines a tubular horizontal reaction area 23. The feed conveyor system 12 directs a carbon feed through inlet 24 into this reaction area 23 immediately downstream from a combustion zone 26 immediately forward of combustion nozzle 16. The width and length of reaction are determined by feed rate and the capacity to generate the requisite heat.

Combustion nozzle 16 is attached to a first end of the horizontal reactor 14. The combustion nozzle 16 includes a fuel inlet 28 and an oxygen inlet 30. The oxygen inlet 30 leads to a concentric path surrounding the fuel inlet 28 and leads to a combustion chamber 34.

The nozzle further includes an oxygen steam inlet 36 which again leads to a concentric path 38 which leads to an outlet 39 immediately upstream of the combustion chamber 34.

Finally, the combustion nozzle 16 includes a steam inlet 40 which leads to a concentric path 42 which surrounds the concentric path 38 for the oxygen steam inlet 36. This concentric path 42 is defined by an outer wall 44 which is designed to cause steam passing through the path to swirl. In particular, the wall 44 can be machined or rifled to promote swirling of the gas.

In an alternate embodiment, an atomic hydrogen torch can be used to provide the heat in place of the combustion chamber.

The feed conveyor system 12 includes a vertical inlet 50 which is connected to a feed source such as a devolatilization unit, as discussed hereinafter. The vertical inlet 50 includes a central auger which directs the feed in the direction of arrow 53 to a horizontal feed section 54. The horizontal feed section 54 also includes an auger 56 which pushes the feed from the vertical inlet 50 to a vertical conduit 58 which communicates with the reaction area 23 immediately downstream of the combustion nozzle 16.

Figure 2:
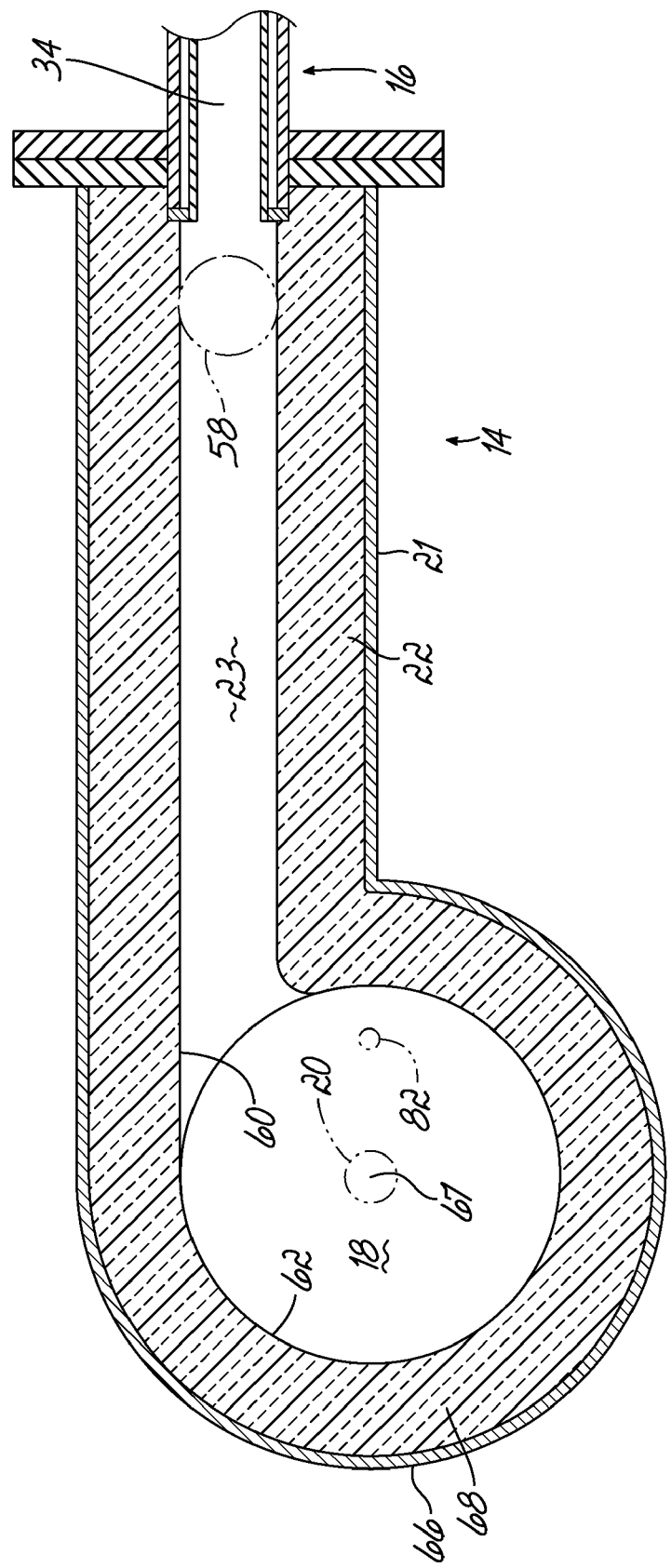
FIG. 2 is a cross sectional view taken at lines 2-2 of FIG. 1.
Figure 3:
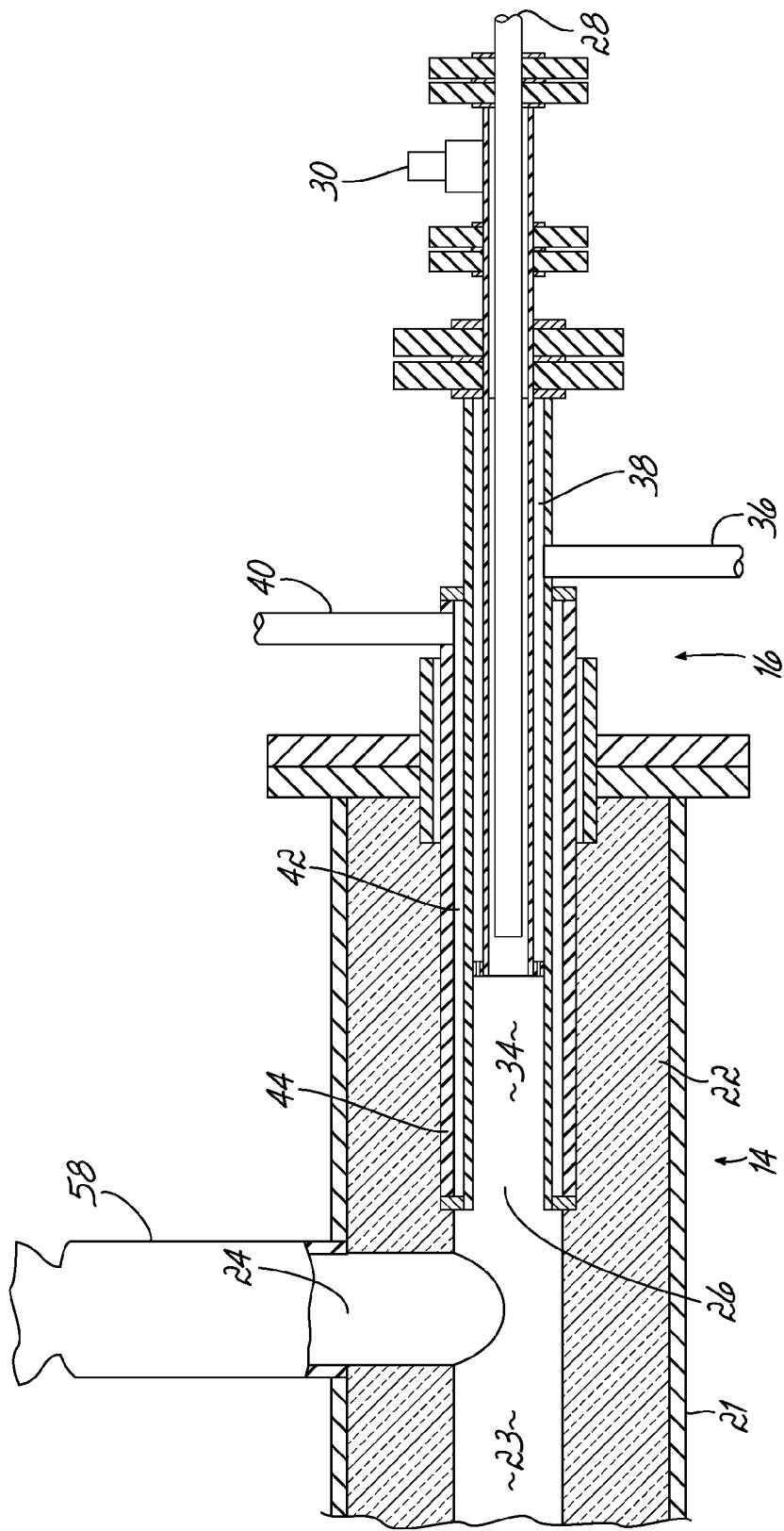
FIG. 3 is an enlarged cross sectional view of the combustion nozzle for use in the present invention.

A second end 60 of the horizontal reaction area 23 leads into the resonance chamber 18. As shown, the reaction area 23 is aligned along a tangent with the cylindrical resonance chamber 18. As shown in FIGS. 1 and 2, the resonance chamber 18 has a cylindrical wall 62 and a closed top 64. The wall has a steel casing 66 and a refractory lining 68. A gas outlet 20 extends through the top 64 into the center 67 of the resonance chamber 18 slightly below the inlet 60 from the horizontal reaction area 23. Also extending through the closed top 64 is a test port inlet 82.

The resonance chamber 18, in turn, has a bottom end which is in communication with a frustoconical section 70. Again, this section 70 has a steel casing 72 and a refractory lining 74. Section 70 has a tapered side wall 71 and a narrowed bottom outlet 76 which is in communication with a recovery tank 78. As shown, this recover tank is partially filled with water 80.

The feed material for the reactor 10 can be any carbonaceous material. It can be formed from organic material, polymeric material such as ground tire, wood, coal, and the like. Preferably, the feed will be a devolatilized carbon source in which reactive oxygen has been eliminated, as well as other organic components using a devolatilization reactor, such as that disclosed in U.S. Pat. No. 6,863,878, the disclosure of which is hereby incorporated by reference. This is upstream of apparatus 10 and not shown in the drawings.

In operation, feed material introduced into apparatus 11 will be conveyed through the conveyor system 12 and fall into the reaction area 23 immediately downstream from the combustion nozzle 16. The intersection of the vertical and horizontal feed conveyor provides a seal, preventing gas from flowing out the feed inlet.

Syngas, and other fuel such as propane or natural gas, is introduced through the fuel inlet of the nozzle and, at the same time, oxygen is added so that stoichiometric combustion occurs at the combustion chamber. This will generate the heat necessary to cause the substoichiometric reaction of the carbon with steam and any additional oxygen as necessary to form syngas. The burner temperature should be at least 1300° F., more typically 2300° F.

At the same time, the oxygen and fuel are introduced into the burner nozzle 16, a blend of oxygen and water or steam is introduced downstream of the combustion chamber, as well as additional water/steam in the exterior portion of the reactor. The heat from the combustion raises the temperature of the water/steam enabling it to react with the carbon. The added oxygen increases the temperature of the gas stream during the reducing reaction immediately downstream of the stoichiometric combustion in the combustion chamber 34. The added oxygen also promotes formation of carbon monoxide. Generally, the additional oxygen will be very minor, less than 1% of the water by weight. The steam swirls around, combines with the combustion products from the stoichiometric combustion and contacts the carbon source introduced through inlet 24.

tinue downwardly into the tank 78. This is filled with hot water which will quench the ash where it will be eventually separated.

The invention will be further appreciated in light of the following detailed example.

EXAMPLE

Using an apparatus as shown in the Figures, wherein the reaction area 23 is approximately 4 inches in diameter and 48 inches in length, raw wood as a feed material was used to produce syngas. The feed rate of the wood chips was approximately 25 pounds per hour, and the water flow rate was approximately 0.25 gph. Temperature probes located at various points along the reactor are listed, and the temperature probe for the burner was slightly upstream of the burner. Probe 1 is located immediately downstream of the burner and probe 4 is located in the residence chamber. The oxygen flow rate to the burner was 1.5 scfh, and the fuel, in this case propane gas, was 40 scfh. The secondary oxygen, which is combined with the steam through inlet 36, was varied, as indicated in Table 1, below. This reaction was conducted over a period of an hour and 11 minutes. The gas product obtained was approximately 30% hydrogen, 32% carbon monoxide, and 27% carbon dioxide, as measured by gas chromatography.

TABLE 1

| | Reading 1 | Reading 2 | Reading 3 | Reading 4 | Reading 5 |
|---|---|---|---|---|---|
| Time | 12:00 | 12:25 | 12:45 | 1:00 | 1:11 |
| Cyclone Temperature (° F.) | 600 | 400 | 400 | 525 | 670 |
| Reactor Temperature 1 (° F.) | 1443 | 1456 | 1654 | 1760 | 1949 |
| Reactor Temperature 2 (° F.) | 1390 | 1400 | 1616 | 1770 | 1949 |
| Reactor Temperature 3 (° F.) | 1257 | 1229 | 1388 | 1550 | 1725 |
| Reactor Temperature 4 (° F.) | 417 | 462 | 526 | 594 | 655 |
| Burner Temperature (° F.) | 1397 | 1417 | 1418 | 1425 | 1398 |
| $O_2$ Zone 2 flow Rate (ounces/hour) | 3 | 3 | 4 | 6 | 6.5 |
| Feed Chamber Pressure (psi) | 3 | 3 | 3 | 3 | 2 |
| Reactor Chamber Pressure (psi) | 3 | 3 | 3 | 3 | 1 |
| Upper Cyclone Chamber Pressure (psi) | 3 | 3 | 3 | 3 | 1 |
| Lower Cyclone chamber Pressure (psi) | 3 | 3 | 3 | 3 | 3 |

It is desirable to have the temperature in the horizontal reaction chamber to be at least about 1200° F., and generally 2300° F., and up to 3000° F., or more. At 2300° F., any ash that remains from the char will be melted.

The pressure in the reaction zone can be up to from atmospheric up to 1000 psig, although pressure is not a determining factor in the reactor, but is incidental to reaction conditions.

The combustion at nozzle 16 creates a high velocity gas stream that will pass through the reaction chamber into the resonance chamber 18. Chamber 18, also maintained at least 1000° F., provides sufficient time for complete reaction. Generally, the gas will be in the reaction area 23 from about 0.1 to 0.3 seconds, with the velocity of the gas passing through the chamber about 500 to about 3000 ft/sec.

The horizontal reaction area 23 is linear and its second end 60 is aligned tangentially with the cylindrical wall 62 of the residence chamber 18 causing a swirling movement of the gas around the wall 62 of the residence chamber 18. As the reaction continues, gas is forced downwardly, and the syngas will be collected from outlet tube 20 which is directed to a collection system (not shown).

The denser material formed in the reaction, primarily ash, will continue into the frustoconical section 70 and will con- This demonstrates that the apparatus and method of the present invention efficiently produces commercially useful syngas.

The reaction can be further improved by increasing burner temperature, reducing oxygen content and changing the feed material.

This has been a description of the present invention along with the preferred method of practicing the present invention. However, The invention itself should only be defined by the appended claims, Wherein I claim:

1. A method of forming syngas comprising:
   establishing a high velocity stream of hot gas flowing at about 500 to about 3,000 ft./sec. in a horizontal reactor by combusting a fuel at a combustion nozzle and combining combustion products formed at said combustion nozzle with steam;
   adding a carbon source to said high velocity stream of hot gas in said horizontal reactor at a temperature effective to form syngas;
   directing said syngas tangentially into a cyclone separator from said horizontal reactor by said high velocity stream of hot gas flowing into said separator and maintaining the temperature of said gas in said separator at about 1,000° F.;

collecting syngas from a top portion of said separator; and collecting ash from a bottom portion of said separator.

2. The method claimed in claim 1 wherein said stream of hot gas is a horizontal stream of hot gas.

3. The method claimed in claim 1 wherein said stream of hot gas is formed by combining oxygen and syngas in the presence of steam.

4. The method claimed in claim 2 wherein said carbon source is dropped into said horizontal stream of hot gas.

5. The method claimed in claim 3 wherein ash is also formed in said horizontal stream of hot gas and wherein said ash is deposited into a collection container at a bottom of said cyclone separator.

6. The method claimed in claim 5 wherein said collection chamber includes water.

* * * * *